United States Patent [19]
Hirotani et al.

[11] Patent Number: 5,203,811
[45] Date of Patent: Apr. 20, 1993

[54] METHOD OF POSITIONING A DOOR IN AN AUTOMOBILE BODY STRUCTURE

[75] Inventors: Kazunori Hirotani; Toshisumi Tokunaga, both of Hiroshima, Japan

[73] Assignee: Mazda Motor Corporation, Hiroshima, Japan

[21] Appl. No.: 716,975

[22] Filed: Jun. 18, 1991

[30] Foreign Application Priority Data

Jun. 21, 1990 [JP] Japan .................. 2-163762
Jun. 21, 1990 [JP] Japan .................. 2-163764

[51] Int. Cl.⁵ ............................ B23Q 17/00
[52] U.S. Cl. ........................ 29/407; 29/429; 29/434
[58] Field of Search ............ 29/407, 429, 430, 434, 29/705, 709, 711, 712, 714, 771, 783, 784, 787, 791, 793, 795

[56] References Cited

U.S. PATENT DOCUMENTS

| 4,589,184 | 5/1986 | Asano et al. | 29/407 |
| 4,589,199 | 5/1986 | Ohtaki et al. | 29/407 |
| 4,627,158 | 12/1986 | Mitoh | 29/771 |
| 4,736,515 | 4/1988 | Catena | 29/714 |
| 4,757,608 | 7/1988 | Ochi | 29/712 |

FOREIGN PATENT DOCUMENTS

| 3443312 | 1/1986 | Fed. Rep. of Germany . |
| 3627706 | 3/1988 | Fed. Rep. of Germany . |
| 63-17190 | 1/1988 | Japan . |
| 1-14579 | 5/1989 | Japan | 29/712 |
| 301478 | 12/1989 | Japan | 29/787 |
| 2-08180 | 8/1990 | Japan | 29/705 |
| 2-08184 | 8/1990 | Japan | 29/714 |
| 2-08185 | 8/1990 | Japan | 29/714 |
| 2-58485 | 10/1990 | Japan | 29/407 |

Primary Examiner—P. W. Echols
Assistant Examiner—David P. Bryant
Attorney, Agent, or Firm—Wenderoth, Lind & Ponack

[57] ABSTRACT

An automobile door is mounted in a body structure via generally vertically spaced first and second hinges. The door is initially placed so as to be opposed to a door opening formed in the body structure, and at least one of the bolts for tightening the first hinge is provisionally tightened more tightly than any other bolts. Thereafter, the door is rotated about the more tightly pre-tightened bolt for proper positioning of the door. Finally, all the bolts are completely tightened.

9 Claims, 7 Drawing Sheets

METHOD OF POSITIONING A DOOR IN AN AUTOMOBILE BODY STRUCTURE

BACKGROUND OF THE INVENTION

1. Field of the Invention

The present invention is concerned with improvements in and relating to a method of mounting a door in an automobile body structure.

2. Description of the Prior Art

Japanese Patent Laid-open Application (unexamined) No. 63-17190 discloses a method of mounting a door in an automobile body structure conveyed along an automobile body assembling line. In the method as proposed in this disclosure, a reference pin mounted on one of two vertically spaced hinges is initially inserted into a reference hole formed in that portion of the body structure on which the hinges are to be fixedly mounted. The door is then rotated a predetermined amount about the reference pin for proper positioning thereof. Finally, both the hinges are rigidly secured to the body structure by means of bolts.

This method requires a reference pin mounted on one of the hinges and a reference hole formed in the body structure, thereby increasing the number of manufacturing operations or working processes. As a result, there arises the problem that efficiency of the door mounting operation is reduced.

Furthermore, the door is clamped by a material handling jig mounted on a robot arm. Accordingly, even though the door is properly positioned prior to the mounting thereof in the body structure as mentioned previously, the door generally has a tendency to move downwardly due to the weight of the door when the material handling jig releases the clamping thereof. As a result, there arises the problem in that the door slips downwardly from a proper location thereof. The reason for this is that the hinges have respective gaps for permitting the movement of the door, thereby producing looseness.

In positioning the door, the amount of rotation thereof about the reference pin can be determined based upon a measurement in which the vertical position of a door-position detecting portion provided in the door is determined through an image processing operation. However, when the door is slightly open, measurement errors occur in the vertical position of the door-position detecting portion, thus resulting in improper positioning of the door.

More specifically, in some recent automobile body structures, generally vertically spaced hinge pins for pivotally mounting a door therein are not coaxially aligned with each other but are inclined so that opposed ends thereof may be directed forwardly or rearwardly for the purpose of smoothly opening and closing the door. This recent trend, resulting in installation errors due to visual sensors (cameras) and the like, cause errors in the vertical position of the door in accordance with the amount of opening thereof at the time the door is mounted in the body structure.

SUMMARY OF THE INVENTION

The present invention has been developed to overcome the above-described disadvantages.

It is accordingly an object of the present invention to provide an improved method of mounting a door in an automobile body structure, which is capable of reducing the number of working processes without requiring a reference pin and a reference hole for proper positioning of the door on the body structure, thereby increasing the door mounting efficiency.

Another object of the present invention is to provide a method of the above-described type capable of enhancing the door mounting operation by eliminating a tendency of the door to move downwardly due to gravity after the installation thereof on the body structure.

In accomplishing these and other objects, a method according to the present invention comprises the steps of:

(a) placing the door so as to be opposed to a door opening formed in the body structure;

(b) provisionally tightening at least one of a number of bolts for tightening hinges of the door more tightly than any other of the bolts;

(c) rotating the door about the more tightly provisionally tightened bolt for proper positioning of the door; and (d) completely tightening all the bolts.

Preferably, a pressure is applied to a hinge opposite to the hinge having the more tightly provisionally tightened bolt to rotate the door. The former hinge may be pulled instead of applying a pressure thereto.

In the method according to the present invention, the more tightly provisionally tightened bolt serves as a reference pin to be used for proper positioning of the door in the body structure. As a result, a reference pin and a reference hole provided previously no longer are required, thus reducing the number of working processes and increasing the door mounting efficiency.

In positioning the door, applying a pressure to or pulling one of the hinges can eliminate looseness, and consequently, a tendency of the door to move downwardly, which otherwise might take place after the installation thereof in the body structure also can be eliminated, thus enhancing the door mounting accuracy.

A method according to another aspect of the present invention comprises the steps of:

(a) placing a door so as to be opposed to a door opening formed in a body structure;

(b) locating a vertical position of a reference point provided in the door through an image-processing operation, the reference point being used to determine the vertical position of the door;

(c) detecting at least one of the parameters of the area of the reference point and the distance in a direction longitudinally of the body structure between the center of the reference point when the door is closed and that of the reference point of the door which is now being mounted in the body structure under the conditions in which the door is open;

(d) correcting the vertical position of the reference point based upon a parameter thus detected; and (e) moving the door a predetermined amount based upon the corrected vertical position of the reference point for proper positioning of the door.

Conveniently, the reference point is provided in an outer handle of the door.

In this aspect of the present invention, even when the door is slightly open, a measured value in the vertical position of the reference point is appropriately corrected in accordance with the amount of opening of the door, thereby enhancing the door mounting accuracy.

BRIEF DESCRIPTION OF THE DRAWINGS

These and other objects and features of the present invention will become more apparent from the following description taken in conjunction with the preferred embodiment thereof with reference to the accompanying drawings, throughout which like parts are designated by like reference numerals, and wherein.

DETAILED DESCRIPTION OF THE PREFERRED EMBODIMENTS

Figure 1:
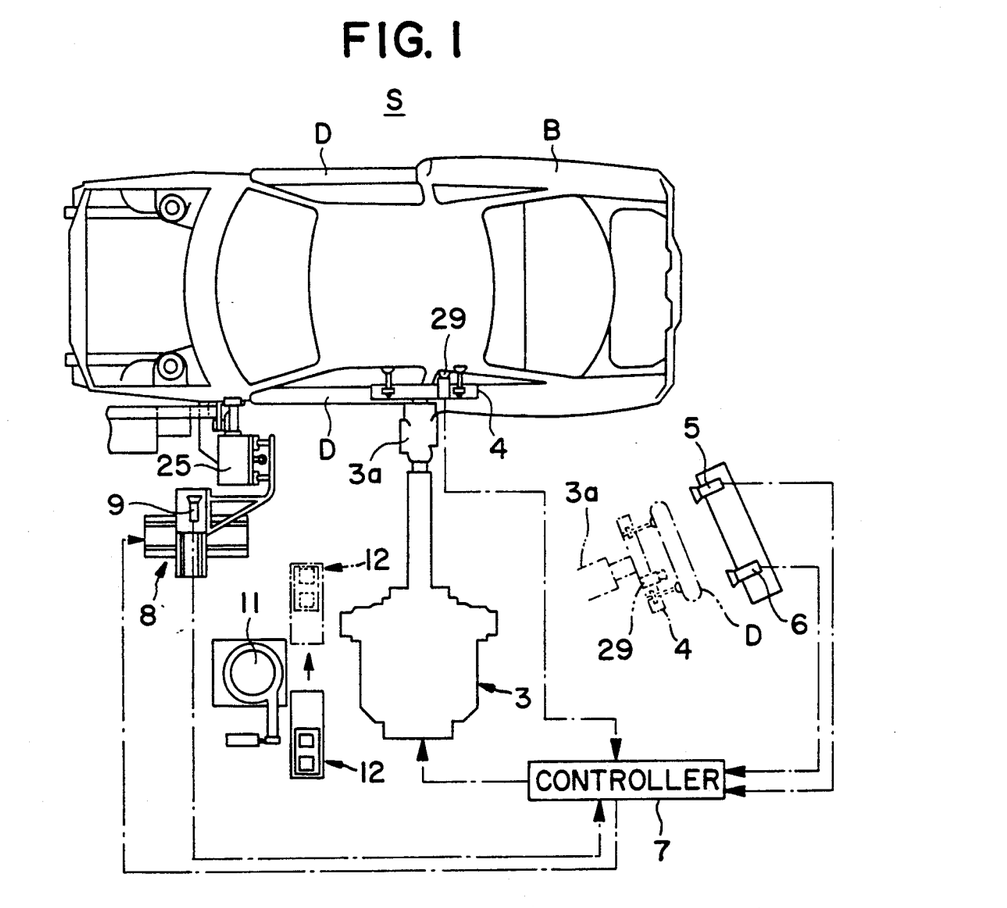
FIG. 1 is a schematic top plan view of a door mounting station to which a method according to the present invention is applied.
Figure 2:
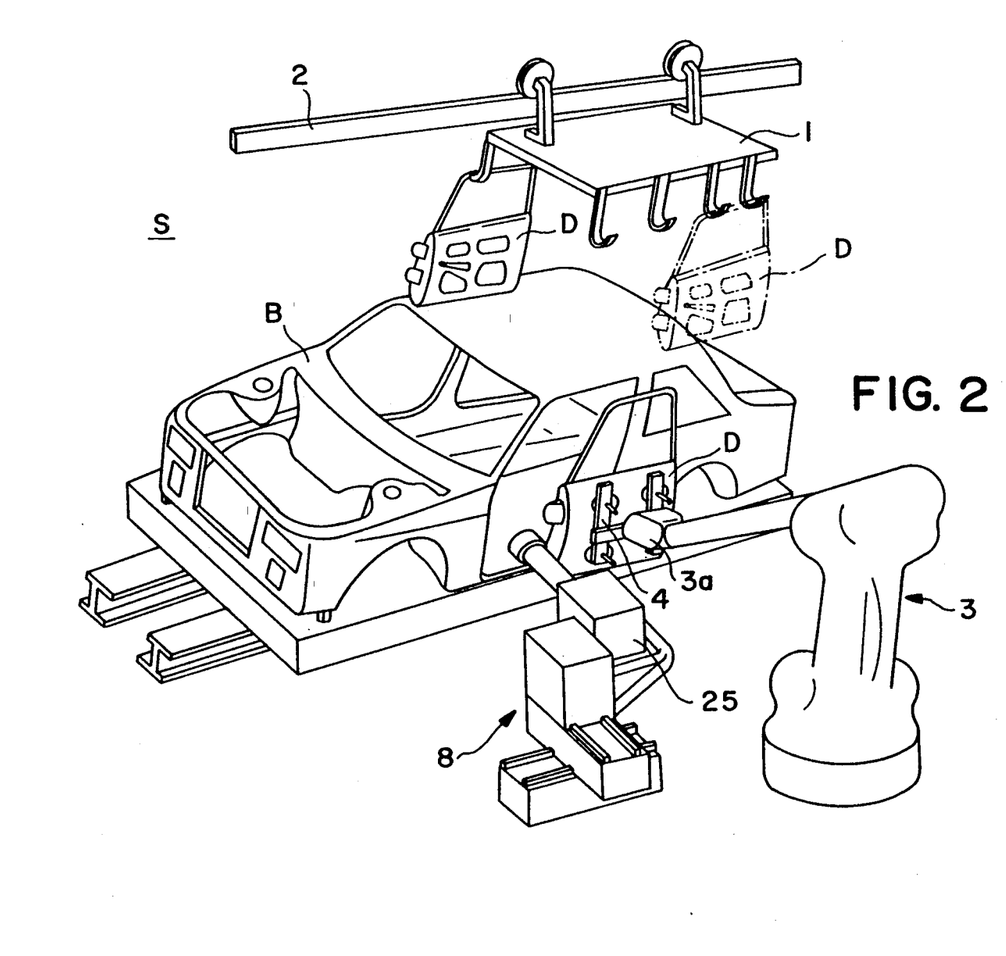
FIG. 2 is a perspective view of the door mounting station of FIG. 1.

Referring now to the drawings, there is shown in FIGS. 1 and 2 a door mounting station S provided in an automobile body assembling line. A door D is mounted in an automobile body B conveyed to the door mounting station S based upon a method according to the present invention. When the door D carried by a hanger 1 is conveyed to the door mounting station S along a conveyor rail 2, a door mounting robot 3 is operated to take down the door D from the hanger 1 with the use of a material handling jig 4 mounted on one end of an arm 3a thereof.

The door D is then conveyed to a location where the position of a reference point (not shown) set in advance in the door D is measured by an image processing operation employing a first camera 5 and a second camera 6. The measured positional value of the reference point is input to a controller 7 including a CPU and the like for measurement of a positional deviation of the door D relative to the material handling jig 4.

Thereafter, the position of the door D is measured with respect to a reference point on the side of the body B by an image processing operation employing a third camera 9 mounted on a bolt tightening device 8, which can move in three-axial directions. In this embodiment, a bolt hole (not shown) for receiving a hinge mounting bolt serves as the reference point on the side of the body B. The measured positional value of the door D is then input into the controller 7 for measurement of a positional deviation of the body B relative to a proper working posture. The controller 7 modifies a locus of movement of the door mounting robot 3 based upon both the measured values. Thereafter, the door D is arranged so as to be opposed to a door opening formed in the body B by the door mounting robot 3 the locus of movement of which has been modified. The position of the bolt tightening device 8 is also modified by instructions from the controller 7 in preparation for a subsequent bolt tightening operation.

On the other hand, the bolt tightening device 8 receives bolts 10 (shown in FIGS. 3 and 5) from a parts feeder 11 via a bolt delivery device 12. This process will be explained hereinafter with reference to FIGS. 3 and 5. Initially, the parts feeder 11 feeds the bolts 10 to a supply passage 13. The movement of one of the bolts 10 towards the bolt delivery device 12 is interrupted by a rotatably arranged stopper 15, which is biased by a coil spring 14 so as to cross or block the supply passage 13.

An extrusion or discharging cylinder 16 is disposed in the proximity of the parts feeder 11 and has a piston rod 16a capable of moving along the supply passage 13. Upon operation of the extrusion cylinder 16, a rod 17, connected with an end of the piston rod 16a moves forwards to rotate the stopper 15 against the biasing force of the coil spring 14 in the clockwise direction as viewed in FIG. 3 so that the bolt 10 may be supplied to the bolt delivery device 12.

Figure 3:
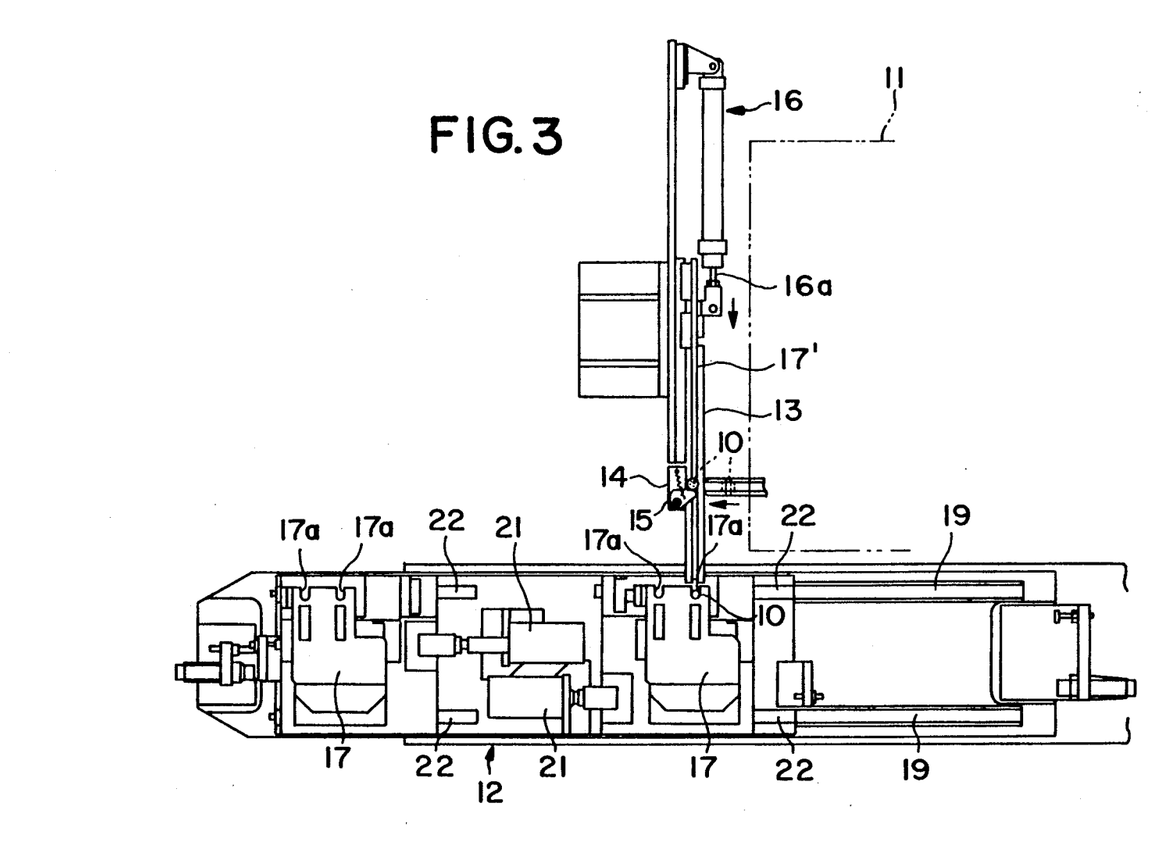
FIG. 3 is a top plan view of a bolt delivery device.
Figure 4:
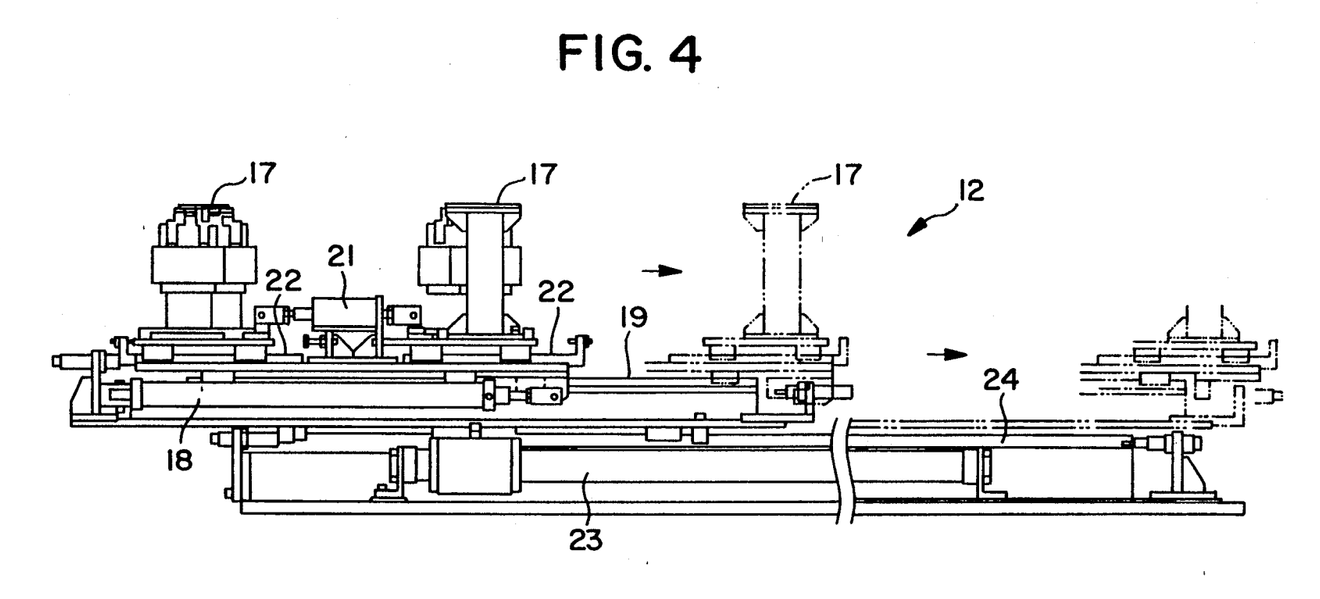
FIG. 4 is a front elevational view of the bolt delivery device.

The bolt delivery device 12 is provided with two guide rails 19 extending in a direction generally perpendicular to the supply passage 13 and two bolt receivers 17 driven by a first cylinder 18 so as to travel horizontally along the guide rails 19. The distance between the two bolt receivers 17 corresponds to that between an upper hinge 20H and a lower hinge 20L (both shown in FIG. 6) of the door D. Each of the bolt receivers 17 has two bolt receiving recesses 17a, the distance between which corresponds to that between two bolt receiving holes 20a formed in each of the hinges 20H and 20L. The bolt delivery device 12 is further provided with two second cylinders 21 for moving respective bolt receivers 17 along two guide rails 22 so that each of the bolts 10 may be supplied to one of the bolt receiving recesses 17a. The bolt receivers 17, the first and second cylinders 18 and 21, the guide rails 19 and 22, and the like can horizontally move together along two guide rails 24 between a bolt supply position on the side of the parts feeder 11 and a bolt delivery position on the side of the bolt tightening device 8 by the operation of a third cylinder 23. Accordingly, both the bolt receivers 17 are horizontally moved by the operation of the first and second cylinders 18 and 21 and the bolts 10 are supplied to the four bolt receiving recesses 17a by the operation of the extrusion cylinder 16 at the bolt supply position.

Thereafter, the bolt receivers 17 to which four bolts 10 have been supplied are horizontally moved by the operation of the third cylinder 23 to the bolt delivery position where the bolt receivers 17 are placed in a stand-by condition.

Figure 5:
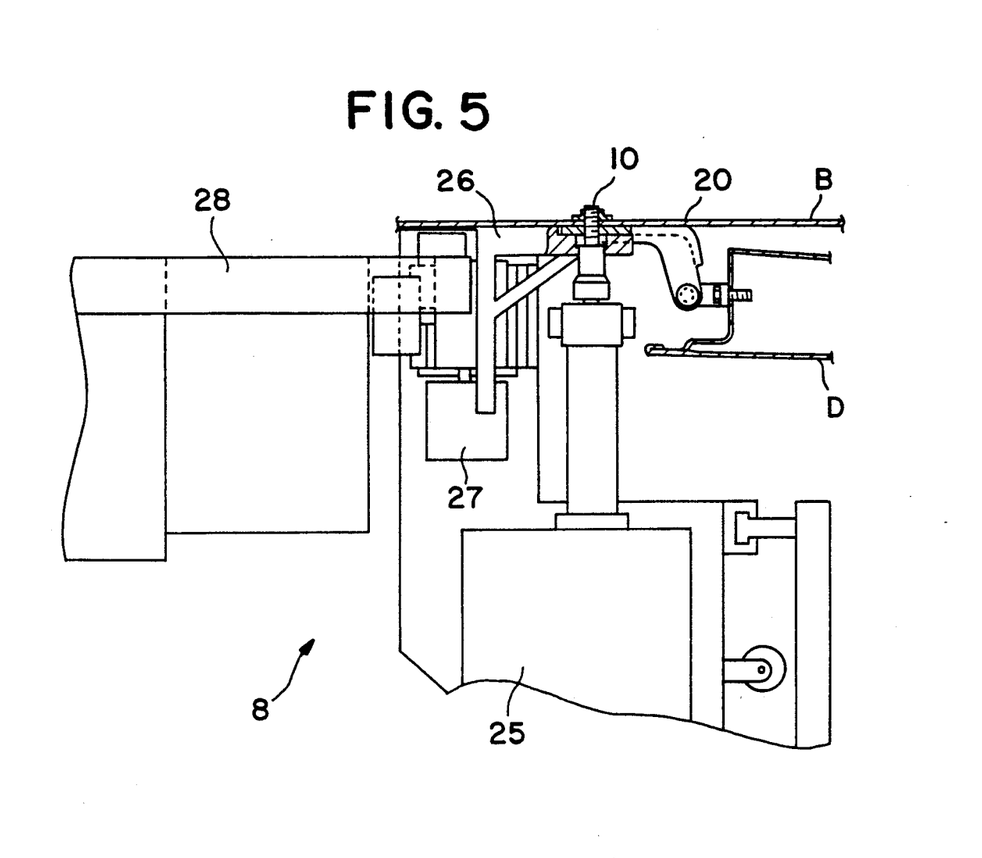
FIG. 5 is a fragmentary top plan view, on an enlarged scale, of a principal portion of a bolt tightening device.

When the placement of the door D in the proximity of the door opening of the body B and the supply of the bolts 10 to the bolt delivery position are achieved in the above-described manner, a bolt runner 25 is moved to the bolt delivery position by moving the bolt tightening device up and down, right and left, or back and forth, i.e., in the three axial directions. The bolt runner 25 is then vertically rotated 90° by the operation of a rotary mechanism (not shown) to receive the four bolts 10 and is further vertically rotated 90° in the opposite direction to assume the original posture for the tightening operation.

Thereafter, the bolt tightening device 8 is moved in the three axial directions in preparation for the bolt tightening operation. In this event, the hinges 20H and 20L are biased against the body B by means of a hinge biasing member 26. The biasing force of the hinge biasing member 26 acting upon the hinges 20H and 20L is regulated by a damper 27 disposed in the proximity of the hinge biasing member 26.

Figure 6:
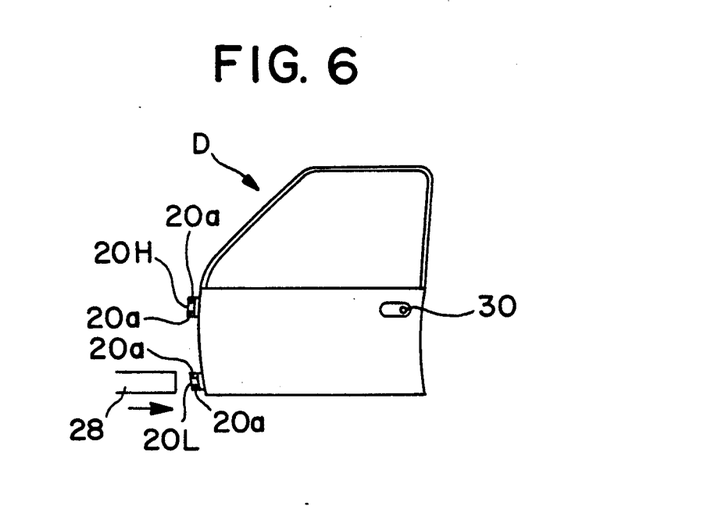
FIG. 6 is a front elevational view of a door.

The four bolts 10 are then provisionally tightened by the operation of the bolt runner 25 in such a manner that at least one of upper bolts 10 for tightening the upper hinge 20H is provisionally tightened more tightly than any other of the four bolts 10.

Subsequently, a pressure is applied to the lower hinge 20L by the use of a hinge pressure device 28, thereby rotating the door D a predetermined amount about the more tightly pre-tightened bolt 10 for proper positioning of the door D.

More specifically, a reference hole 30 formed in an outer handle provided on the door D to serve as a door-position detecting portion is image-processed by means of a fourth camera 29 mounted on the material handling jig 4 of the door mounting robot 3 for determination of the vertical position thereof. A value obtained through such image-processing operation is then input into the controller 7 for measurement of the positional deviation of the reference hole 30 of the outer handle with respect to the proper vertical position thereof. The controller 7 compares this measured value with the measured value of the body B, which has been read by the third camera 9 with respect to the reference hole for receiving a hinge mounting bolt. When the difference between these two measured values is within an allowable range, the door D is regarded as being properly positioned. Finally, all the bolts 10 are completely tightened and the mounting operation of the door D with respect to the body B is terminated. In contrast, when the difference between the measured values is not within the allowable range, adjustments are made with respect to the door D by the hinge pressure device 28 until the difference falls in the allowable range. After the adjustments have been completed, all the bolts 10 are finally completely tightened.

Figure 7:
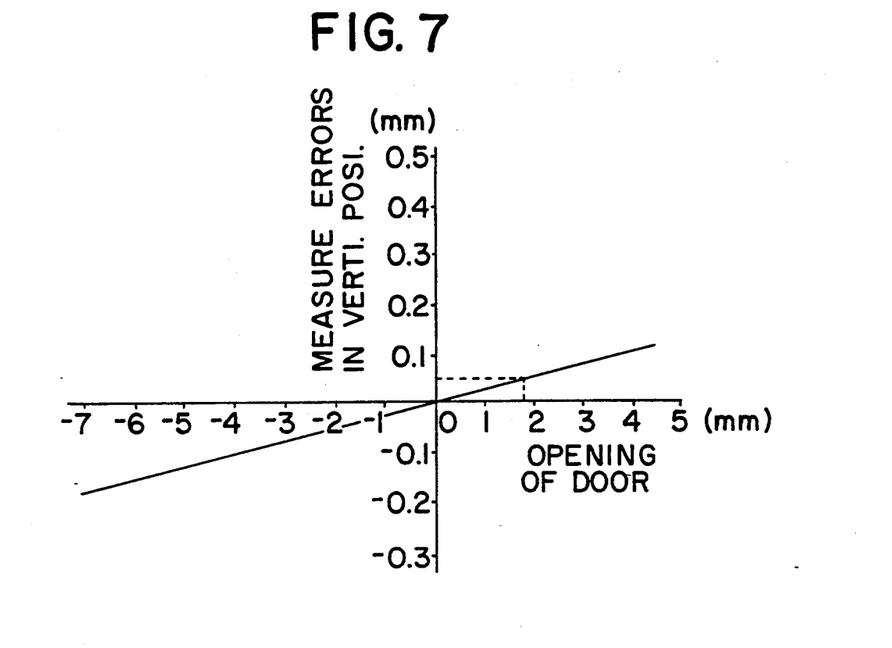
FIG. 7 is a graph indicative of a relationship between an amount of opening of the door and measurement errors in the vertical position of a reference hole formed in an outer handle of the door.

At this moment, it is necessary to pay attention to measurement errors in the vertical position of the door D which may take place when the door D is open. The measurement errors vary proportionally to the amount of opening of the door D, as shown in FIG. 7.

Figure 9:
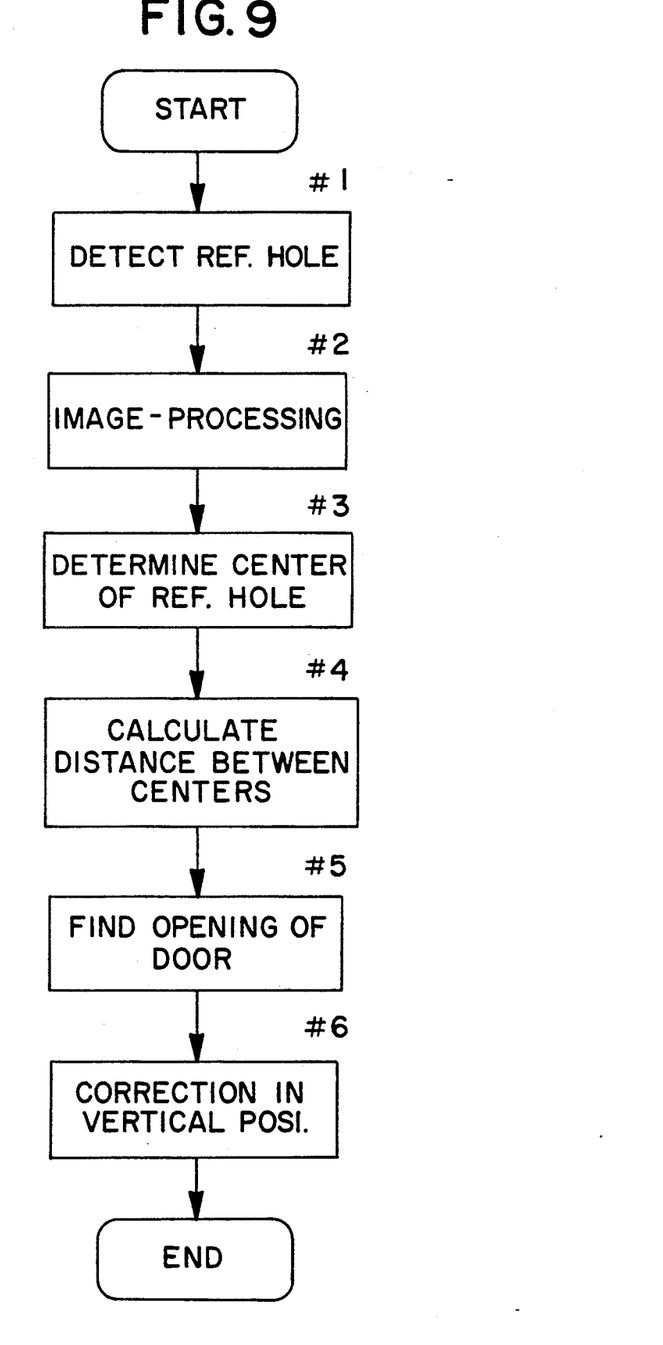
FIG. 9 is a flow-chart indicative of a procedure of correcting the vertical position of the door.

FIG. 9 is a flow-chart indicative of the procedure of correcting the vertical position of the door D.

Figure 8:
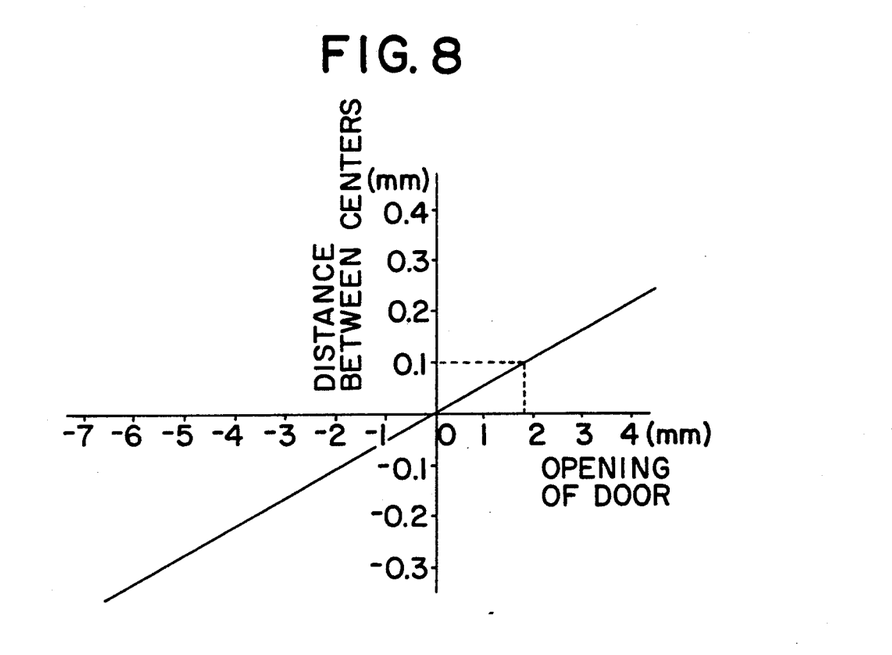
FIG. 8 is a graph indicative of a relationship between the amount of opening of the door and a distance between the center of the reference hole when the door is closed and that of the reference hole of the door which is now being mounted in a body structure under the conditions in which the door is open.

In the flow-chart of FIG. 9, the reference hole 30 formed in the outer handle of the door D which is about to be completely fitted to the body D is initially detected (step #1) and is subjected to an image-processing operation (step #2), as discussed previously. Thereafter, the center of the reference hole 30 is determined by the controller 7 under the conditions in which the door D is open (step #3). The controller 7 then calculates the distance between the center of the reference hole 30 when the door D is open and that when the door D is closed in a direction longitudinally of the body B (step #4). The position of the center of the reference hole 30 when the door D is closed is input into the controller 7 in advance. The controller 7 further determines the extent or amount of opening of the door D based upon this distance (step #5). The amount of opening of the door D and the distance between the center of the reference hole 30 when the door D is closed and that when the door D is open are in a proportional relationship with each other, as shown in FIG. 8. Alternatively, the amount of opening of the door D may be determined by finding the area of the reference hole 30 of the outer handle, which is represented by the number of pixels in the image-processing operation. The reason for this is that the amount of opening of the door D is also proportional to the area of the reference hole 30 of the outer handle. Accordingly, prior to the determination of the vertical position of the reference hole 30 of the outer handle, at least one of the area of the reference hole 30 and the distance between the center of the reference hole 30 when the door D is closed and that when the door D is open is detected. Thereafter, measurement errors in the vertical position of the reference hole 30 of the outer handle are determined in accordance with the graph of FIG. 7. Based upon the measurement errors determined in this way, the vertical position of the reference hole 30 of the outer handle is appropriately corrected (step #6).

As described above, when the vertical position of the door D is adjusted by the hinge pressure device 28, the amount of opening of the door D and the measurement errors in the vertical position of the reference hole 30 corresponding thereto are detected in order for correction of the vertical position of the reference hole 30. Since changes in the vertical position of the reference hole 30 caused by variations in the amount of opening of the door D can be effectively corrected, the door D can be mounted on the body structure with a high degree of accuracy.

Furthermore, in the above-described embodiment, after the door D has been arranged so as to be opposed to the door opening formed in the body B, at least one of bolts 10 for tightening the upper hinge 20H is provisionally tightened more tightly than any other bolts. Thereafter, the door D is rotated a predetermined amount about the more tightly pre-tightened bolt for proper positioning thereof by applying a pressure to the lower hinge 20L, and all the bolts 10 are then completely tightened. Accordingly, one of the bolts 10 for tightening the upper hinge 20 H serves as a reference pin to be used during proper positioning of the door D. As a result, neither reference pin nor reference hole is required, thereby reducing the number of operation processes and increasing the door mounting efficiency.

In addition, since a pushing pressure is applied to the lower hinge 20L at the time of the door positioning, no looseness occurs on the hinges 20H and 20L. This fact can eliminate a tendency of the door D to move downwardly which may be caused by the weight of the door, thereby enhancing the door mounting accuracy.

In the above-described embodiment, although one of the bolts 10 for tightening the upper hinge 20H is provisionally tightened more tightly than any other bolts and the door D is rotated a predetermined amount about the more tightly pre-tightened bolt by applying a pressure to the lower hinge 20L, at least one of bolts 10 for tightening the lower hinge 20L may be provisionally tightened more tightly than any other bolts and the door D may be rotated the predetermined amount about such bolt by applying a pressure to the upper hinge 20H. Also, the door D may be rotated about such bolt by pulling the upper hinge 20H.

Although the present invention has been full described by way of examples with reference to the accompanying drawings, it is to be noted here that various changes and modifications will be apparent to those skilled in the art. Therefore, unless such changes and modifications otherwise depart from the spirit and scope of the present invention, they should be construed as being included therein.

What is claimed is:

1. A method of accurately positioning an automobile door with respect to an automobile body structure preparatory to fixedly mounting said door to said body structure, said method comprising:

placing said door in a location opposed to a door opening in said body structure;

determining a vertical position of said door by detecting by an image-processing operation a vertical position of a reference point on said door;

determining the existence of any errors of said detected vertical position of said reference point due to a relative opened position of said door at said location by detecting at least one parameter of an area of said reference point at said location of said door and a distance in a direction longitudinally of said body structure between a center of said reference point at said location of said door and said center of said reference point at a closed position of said door;

determining a corrected vertical position of said reference point based on the thus detected said at least one parameter; and moving said door relative to said body structure from said location by a distance based on the thus determined said corrected vertical position.

2. A method as claimed in claim 1, comprising providing said reference point in an outer handle of said door.

3. A method as claimed in claim 1, wherein said door includes at least one hinge to be attached by bolts to said body structure, and said moving comprises rotating said door about one said bolt relative to said body structure.

4. A method as claimed in claim 1, further comprising providing said door with upper and lower hinges.

5. A method as claimed in claim 4, wherein said upper and lower hinges are provided with non-coaxially aligned hinge pins.

6. A method as claimed in claim 4, further comprising attaching a first said hinge to said body structure by provisionally tightening at least one bolt extending through said first hinge into said body structure, and said moving comprises rotating said door about said bolt.

7. A method as claimed in claim 6, wherein said rotating comprises imparting a force to a second said hinge.

8. A method as claimed in claim 7, wherein said force is a pushing force.

9. A method as claimed in claim 7, wherein said force is a pulling force.

* * * * *